United States Patent [19]

Bauer

[11] Patent Number: 4,614,323
[45] Date of Patent: Sep. 30, 1986

[54] FISHING ROD HOLDER

[76] Inventor: Jeffrey J. Bauer, 1077 Longfellow Dr., Oconomowoc, Wis. 53066

[21] Appl. No.: 729,524

[22] Filed: May 1, 1985

[51] Int. Cl.$^4$ ............................................. F16M 13/00
[52] U.S. Cl. ....................................... 248/515; 248/538
[58] Field of Search ............... 248/515, 514, 516, 517, 248/478, 538, 291; 43/54.1, 21.2; 403/112, 113, 117

[56] References Cited

U.S. PATENT DOCUMENTS

| | | |
|---|---|---|
| 1,665,914 | 4/1928 | Eck . |
| 1,987,842 | 1/1935 | Sampson . |
| 2,426,881 | 9/1947 | Johnson et al. ...................... 248/515 |
| 3,154,274 | 10/1964 | Hillcourt . |
| 3,159,366 | 12/1964 | Knight . |
| 3,628,759 | 12/1971 | Knedlik .......................... 248/291 X |
| 3,903,633 | 9/1975 | Hutcherson . |
| 4,093,171 | 6/1978 | Mengo . |
| 4,150,506 | 4/1979 | McGinnis et al. ............... 248/523 X |
| 4,202,125 | 5/1980 | Kovacs ............................ 43/21.2 X |
| 4,219,955 | 9/1980 | Lobosco .......................... 43/21.2 X |

Primary Examiner—J. Franklin Foss
Attorney, Agent, or Firm—Glenn A. Busé

[57] ABSTRACT

The fishing rod holder includes an elongated, open ended tubular member for receiving the end of a fishing rod and a support bracket having a rear end, a front end including a support portion engaged by the tubular member and located above the rear end, and an elongated base portion located between and below the rear end front ends. The upper portion of the tubular member rear end is connected to the upper edge of the support bracket rear end for pivotal movement of the tubular member through a generally vertical plane and about a pivot axis located rearwardly and above the longitudinal axis of the tubular member between a forwardly inclined resting position engaging the support portion of the bracket and a raised position. The base portion of the bracket is removably mounted on a support, such as boat oarlock, a troll board, pier, or the like, by a pin which is mounted on and depends from the base portion and fits into a hole in the support. The pin preferably is removably mounted on the bracket by a bolt extending through an aperture in the base portion and threaded into the pin and the base portion includes a plurality of such apertures so that the inclination angle of the tubular member can be adjusted by moving the bolt from one aperture to another.

6 Claims, 7 Drawing Figures

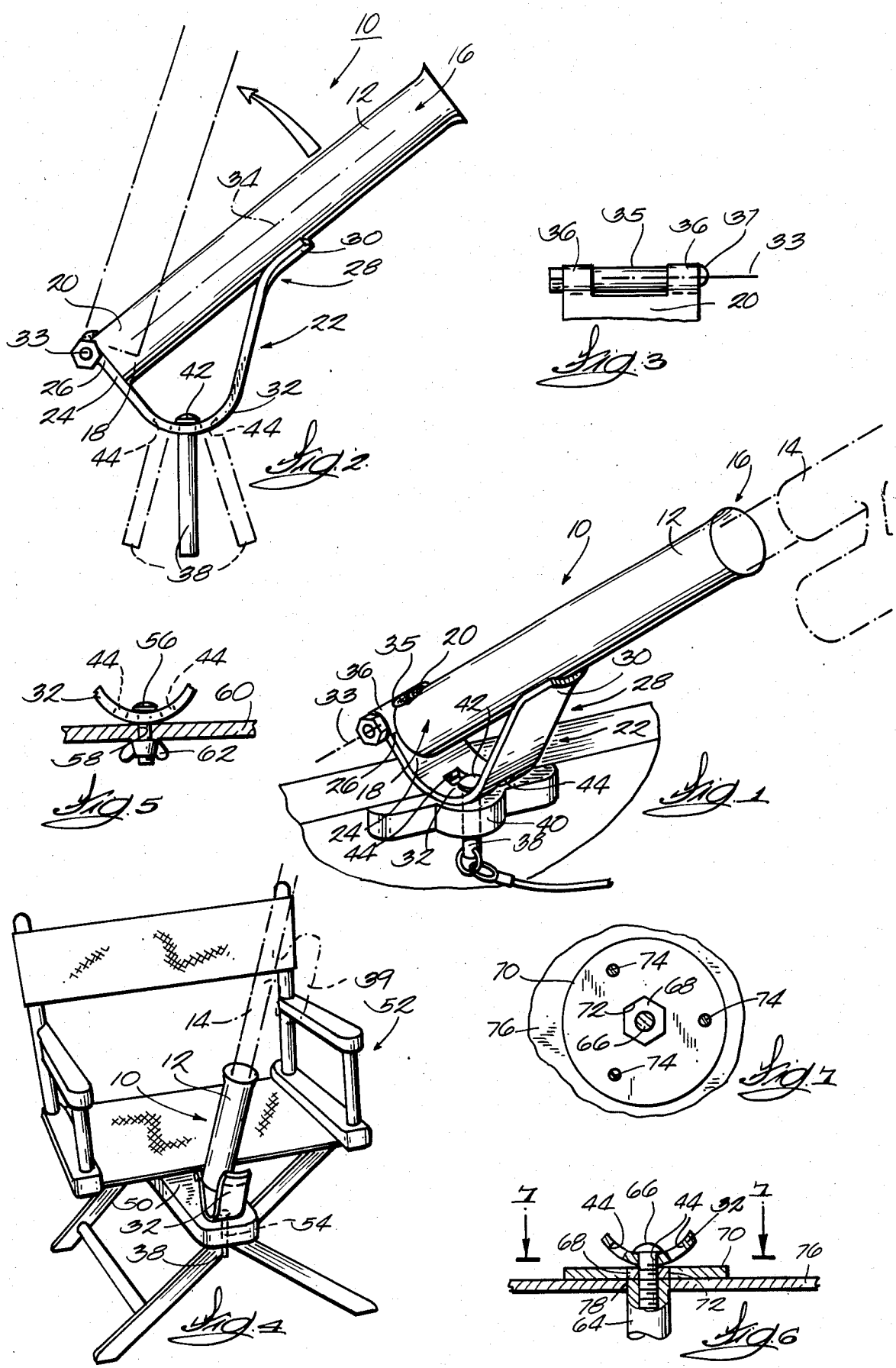

FISHING ROD HOLDER

This invention relates to fishing rod holders for supporting a fishing rod inclined in a fishing position from a boat, pier, or the like.

Representative prior fishing rod holders are disclosed in the following U.S. Pat. Nos.

| Patentee | U.S. Pat. No. | Issue Date |
| --- | --- | --- |
| Eck | 1,665,914 | April 10, 1928 |
| Sampson | 1,987,842 | January 15, 1935 |
| Hillcourt | 3,154,274 | October 27, 1964 |
| Knight | 3,159,366 | December 1, 1964 |
| Hutcherson | 3,903,633 | September 9, 1975 |
| Mengo | 4,093,171 | June 6, 1978 |

While these art fishing rod holders have certain attributes, all have some limitation. For instance, none permit a quick lifting action to be applied on the rod to set a hook without removing the rod from the holder. None is adapted for convenient mounting at different locations on a boat. None can be used for trolling or the like and then moved to a boat seat and act as a gimbal after a fish is hooked. Most cannot be used for both large and small fish.

SUMMARY OF THE INVENTION

One of the objects of the invention is to provide a fishing rod holder which, although simply constructed, is arranged to permit a quick lifting action to be applied on the fishing rod for setting a hook and also permit "playing" a fish without removing the rod from the holder.

Another object of the invention is to provide a fishing rod holder which can be conveniently mounted at various locations on a boat and other supports.

A further object of the invention is to provide a fishing rod holder which can be used for trolling and also as a gimbal after a fish is hooked.

A yet further object of the invention is to provide a fishing rod holder including means for imposing an adjustable drag against lateral rotation of the holder relative to a support.

Other objects, aspects and advantages of the invention will become apparent to those skilled in the art upon reviewing the following detailed description, the drawing and the appended claims.

The invention provides a fishing rod holder including an elongated tubular member for receiving the end of a fishing rod and a bracket having a rear end, an upturned end including a support portion located above the rear end and adapted to engage the tubular member, and an elongated base portion located between and below the rear end and the support portion. The rear of the tubular member is connected to the rear end of the bracket for pivotal movement through a generally vertical plane and about an axis, located rearwardly of the rear end of the tubular member and above the longitudinal axis of the tubular member, between a forwardly inclined resting position engaging the bracket front support portion and a raised position. The bracket base portion is removably secured on a support.

In one embodiment, the base portion of the bracket includes a plurality of longitudinally spaced apertures and the inclination angle of the tubular member when in the resting position is adjusted by a fastening means which is selectively mounted in one of the apertures and adapted to be removably mounted on a support.

In one embodiment, releasable means are provided for preventing lateral rotational movement of the bracket relative to the support until the lateral torque applied on the tubular member reaches a predetermined level.

In one embodiment, the bracket is removably secured to a support by a pin mounted on the base portion of the bracket and adapted to be rotatably received in an aperture in a support.

BRIEF DESCRIPTION OF THE DRAWING

FIG. 1 is a perspective view of a fishing rod holder embodying the invention, shown mounted in the socket of a boat oarlock.

FIG. 2 is a side elevational view of the fishing rod illustrated in FIG. 1, shown removed from a support.

FIG. 3 is a fragmentary, top view of the pivotal or hinge connection between the tubular member and the support bracket.

FIG. 4 is a reduced perspective view of the fishing rod holder illustrated in FIGS. 1-3, shown mounted on a boat chair ready for use like a gimbal.

FIG. 5 is a fragmentary view of an alternate mounting arrangement for the support bracket.

FIG. 6 is a fragmentary view of another alternate mounting arrangement for the support bracket including a retainer for imposing drag against lateral rotation of the tubular member.

FIG. 7 is a view taken generally along lines 7—7 in FIG. 6.

DESCRIPTION OF THE PREFERRED EMBODIMENTS

The fishing rod holder 10 illustrated in FIGS. 1-3 includes an elongated tubular member 12 for receiving the end of a fishing rod 14. The tubular member 12 has an open front end 16 and a rear end 18 including an upper portion 20. The fishing rod holder 10 also has a support bracket 22 including a rear end 24 having an upper edge 26, an upturned front end 28 located above the rear end upper edge 26 and including a support portion 30 adapted to engage the tubular member 12 at an intermediate location, and an elongated base portion 32 located between and below the rear and front ends 24 and 28.

The rear end 18 of the tubular member 12 is pivotally connected to the rear end 24 of the support bracket 22 for pivotal movement through a generally vertical plane about a pivot axis 33 located rearwardly of the rear end 24 of the tubular member 12 and above the longitudinal axis 34 of the tubular member 12. In the specific construction illustrated (FIG. 3), a small tubular sleeve 35 is welded on the upper portion 20 of the tubular member rear end 24 and situated between a pair of laterally spaced, apertured ears 36 on the upper edge 26 of the bracket rear end 24 and a pin or bolt 37 extending through the sleeve 35 and the ears 36.

As best illustrated in FIG. 2, the tubular member 12 is rotatable about the pivot axis 33 between a forwardly inclined resting position engaging the bracket support portion 30 and a raised postion. To best serve as a support surface, the bracket support portion 30 preferably has an arcuate shape corresponding to that of the outer surface of the tubular member 12. When the tubular member 12 is in the resting position, the rear end 18 rests against the rear end portion 24 of the support bracket 22. Accordingly, the rear end of the tubular member 12 can be open so that the butt end of the fishing rod 14 rests against the rear end 24 of the support bracket 22.

Means are provided for removably securing the support bracket 22 on a support. In the embodiment illustrated in FIGS. 1 and 2, such securing means includes a pin 38 which is mounted on and depends from the base portion 32 of the support bracket 22 and which is received in an aperture in a support.

In the embodiment illustrated in FIG. 1, the pin 38 is adapted to fit into the socket of a boat oarlock 40. One end of a conventional fastening means 42 can be attached to the pin 38 in the manner shown with the other end suitably secured to the fishing rod 39. Such an arrangement prevents the rod holder 10 from being inadvertently removed from the oarlock 40 and also acts as a tether for the fishing rod 14 in the event it is accidentally dislodged from the tubular member 12. Alternatively, a cotter key or the like extending through an aperture in the lower end of the pin 38 can be used to prevent inadvertent removal of the fishing rod holder 10 from the oarlock 40.

The pin 38 preferably is removably fastened to the base portion 32 of the support bracket 22. In the specific construction illustrated, the upper portion of tne pin 38 is threaded, a carriage bolt 42 or the like extends through an aperture 44 in the base portion 32 of the support bracket 22 and the pin 38 is threaded onto the bolt 42. A plurality of longitudinally spaced apertures 44 preferably are provided in the base portion 32 of the support bracket 22 so that the inclination angle of the tubular member can be adjusted as illustrated in FIG. 2. For example, the base portion 32 can include the apertures 44 arranged to provide inclination angles of 35°, 45°, and 55°, respectively.

By virtue of the pivot axis 33 being located rearwardly and above the longitudinal axis 34 of the tubular member 12, a quick lifting action can be applied on the fishing rod 14 to set a hook by simply grasping the tubular member 12 and lifting it without removing the fishing rod. The unrestrained upward pivotal movement of the tubular member 12 permits "playing" with the fish without removing the fishing rod 14 from the tubular member 12.

The pin 38 can be removably mounted in a hole in a troll board or the like on a boat. If a large fish is hooked, the fishing rod holder 10 can be removed from that mount and installed in a similar apertured mount 50 on a boat chair 52 as illustrated in FIG. 4. After the pin is dropped into a hole 54 at the front of the mounting board 50 on the boat chair 52, the fisning rod holder 10 can be used like a gimbal to make fighting the fish easier.

The tubular member 12 and the support bracket 22 preferable are made from a relative high strength material, such as stainless steel, so that the rod holder 10 can be used to hold a fishing rod while trolling for larger fish and to hold a fishing rod while fishing for smaller fish from a small boat, pier or the like. The pin 38 can be made from a high strength, low friction sythetic plastic material, such as nylon, to facilitate insertion into and removable from mounting holes or sockets. The fishing rod holder 10 can be mounted at various locations by simply drilling a hole for accommodating the pin 38 in an existing structure, e.g., boat seat, pier, etc., or by providing a separate mounting board or fixture including a hole for receiving the pin 38.

In the embodiment illustrated in FIG. 5, the fishing rod holder can be more permanently, but still removably, mounted on a support, such as boat seat, troll board, pier, or the like, by removing the pin 38 and replacing it with a carriage bolt 56 which extends through a support bracket aperture 44 and a hole 58 in the support 60 and a wing nut 62 threaded onto the bolt 56.

FIGS. 6 and 7 illustrate another alternate mounting arrangement including a slip or a clutch-like joint which provides drag against lateral rotational movement of the support bracket 22 and the tubular member 12 relative to the support on which the support bracket 22 is mounted. In the specific construction illustrated, a pin 64 made from stainless steel or the like is threaded onto a carriage boat 66 extending through an aperture 44 in the base portion 32 of the support bracket 22. A nut-like retainer 68 having a hex shape (or similar configuration which prevents rotation when fitted into an aperture of a complementary shape) is disposed between the base portion 32 of the support bracket and the pin 64. The retainer 68 is tightened into a frictional engagement with the pin 64 to provide a slip joint therebetween.

A mounting fixture 70 including an aperture 72 having a hex shape is mounted, by screws 74 or the like, on a support such as a boat troll board 76 including a hole 78 with which the mounting fixture aperture 72 is coaxially aligned. The pin 64 extends into and is rotatable relative to the hole 78 in the troll board 76. The retainer 68 fits snugly inside the mounting fixture aperture 72 and cooperates therewith to prevent lateral rotational movement of the support bracket 22 relative to the mounting fixture 70 until the lateral torque applied on the tubular member 12 by a "running" fish exceeds the frictional resistance between the retainer 68 and the pin 64. Other suitable conventional arrangements can be used to provide a slip joint or clutch-like connection between the support bracket 22 and the support on which it is mounted.

From the above description, it can be seen that a fishing rod holder embodying the invention is simply constructed, can be used for large and small fish, permits a quick lifting action to be applied on the fishing rod without removing it from the tubular member, can be conveniently mounted at various locations on a boat or other supports, and can be used for trolling and then moved to a boat seat after a fish is hooked and used like a gimbal to facilitate fighting a fish.

From the foregoing description, one skilled in the art can easily ascertain the essential characteristics of the invention and, without departing from the spirit and scope thereof, make various changes and modifications to adapt it to various usages.

I claim:
1. A fishing rod holder comprising
   an elongated tubular member for receiving the end of a fishing rod, said tubular member including an open front end and a rear end;
   a bracket having a rear end, an upturned front end including a support portion located above said rear end and adapted to engage said tubular member at a location intermediate said rear and front ends thereof, and an elongated base portion located between and below said rear end and said support portion;
   means connecting said rear of said tubular member to said rear end of said bracket for pivotal movement of said tubular member through a generally verti- cal plane and about an axis rearwardly of the rear end of said tubular member and above the longitudinal axis of tubular member between a forwardly inclined resting position engaging said support portion of said bracket front end and a raised position; and securing means for removably securing said bracket base portion on a support.

2. A fishing rod holder according to claim 1 wherein said securing means includes a plurality of longitudinally spaced apertures in said base portion of said bracket; and fastening means adapted to be selectively mounted in one of said apertures and removably secured to the support to adjust the inclination angle of said tubular member when in the resting position.

3. A fishing rod holder according to claim 1 wherein said securing means includes releasable retaining means for preventing lateral rotational movement of said bracket relative to the support until the lateral torque applied on said tubular member reaches a predetermined level and thereafter permitting lateral rotational movement of said bracket relative to the support.

4. A fishing rod holder according to claim 1 wherein said securing means includes a pin mounted on said base portion of said bracket and depending therefrom, said pin adapted to be slidably received in an aperture in a support for rotational movement of said bracket relative to the support.

5. A fishing rod holder according to claim 4 wnerein said securing means further includes a plurality of longitudinally spaced apertures in said base portion of said bracket; and a threaded fastener adapted to be selectively inserted tnrough one of said apertures and threaded into said pin to adjust the inclination angle of said tubular member when in the resting position.

6. A fishing rod holder according to claim 5 wherein said securing means further includes a nut-like retainer located between said bracket and said pin and engaging said pin to form a slip joint for imposing drag against rotational movement of said retainer relative to said pin, and a fixture adapted to be mounted on a support and including an aperture having a portion which engages said retainer to prevent rotation of said retainer relative to said bracket.

* * * * *